(12) United States Patent
Hayashi (10) Patent No.: US 7,298,521 B2
(45) Date of Patent: Nov. 20, 2007

(54) INFORMATION PROCESSING APPARATUS, INFORMATION PROCESSING METHOD, RECORDING MEDIUM, AND PROGRAM (75) Inventor: Eiji Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 10/326,069

(22) Filed: Dec. 23, 2002

(65) Prior Publication Data
US 2003/0133157 A1 Jul. 17, 2003

(30) Foreign Application Priority Data
Jan. 11, 2002 (JP) ............................ 2002-005141

(51) Int. Cl.
G06F 15/00 (2006.01)
(52) U.S. Cl. ..................... 358/1.18; 358/1.1; 358/1.12; 358/1.14; 358/1.15

(58) Field of Classification Search ............... 358/1.15, 358/1.12, 1.18, 1.1, 1.14
See application file for complete search history.

(56) References Cited

U.S. PATENT DOCUMENTS 6,549,300 B2 * 4/2003 Motamed et al. .......... 358/1.18

* cited by examiner

Primary Examiner—Twyler Lamb
Assistant Examiner—Vu Hang
(74) Attorney, Agent, or Firm—Fitzpatrick, Cella, Harper & Scinto (57) ABSTRACT Providing an information processing apparatus or the like for reusing generally used index data that has been registered. In order to generate index data that is to be printed on the tabbed area of tabbed paper, data selected from a data group including the registered index data is read and data for performing printing is generated.

7 Claims, 9 Drawing Sheets

BEFORE SPECIFIC TITLE IS PRINTED

AFTER SPECIFIC TITLE IS PRINTED

| NUMBER OF REGISTERED DEFINITION |
|---|
| DEFINITION 1 |
| DEFINITION 2 |
| ⋮ |
| DEFINITION M-1 |
| DEFINITION M |

| REGISTERED GENERIC TITLE 1 |
|---|
| TAB NUMBER N |
| SPECIFIC TITLE 1 |
| SPECIFIC TITLE 2 |
| ⋮ |
| SPECIFIC TITLE N-1 |
| SPECIFIC TITLE N |

FIG. 10

| | | | |
|---|---|---|---|
| FIRST TAB | 2 | ▼ | BEFORE PAGE 2 |
| SECOND TAB | 6 | ▼ | BEFORE PAGE 6 |
| THIRD TAB | 11 | ▼ | BEFORE PAGE 11 |
| FOURTH TAB | 16 | ▼ | BEFORE PAGE 16 |
| FIFTH TAB | 21 | ▼ | BEFORE PAGE 21 |

INFORMATION PROCESSING APPARATUS, INFORMATION PROCESSING METHOD, RECORDING MEDIUM, AND PROGRAM

BACKGROUND OF THE INVENTION

1. Field of the Invention

The present invention relates to an information processing apparatus, an information processing method, a recording medium, and a program for printing print index data that has been registered on a tabbed area of tabbed paper by using a printer having a tabbed-paper printing function.

2. Description of the Related Art

Conventionally, the user of a printing system or the like has to generate index data that is to be printed on a tabbed area of tabbed paper each time he/she wants to make the printer having the tabbed-paper printing function print the index data. In such a case, the user uses an information processing apparatus that can generate print data for printing the index data on the tabbed paper. Such an information processing apparatus is formed as, for example, a personal computer and is connected to the printer. Accordingly, a printing system including the information processing apparatus and the printer is formed.

Conventionally, for making a printer, which has a tabbed-paper printing function (an index-paper printing function), perform tabbed-paper printing, the user has to generate a document for tabbed paper by using an application operated on a host computer. The document for tabbed paper is printed by the printer driver of the printer. In such a case, the user has to make document into which the document for tabbed paper is to be inserted, separately. Further, after printing both the documents, the user has to insert the document for tabbed paper into the separately-made document at a predetermined position.

Thus, the user has to make both the tabbed-paper document and the document into which the tabbed-paper document is to be inserted. Further, the user has to print both the documents separately and insert the tabbed-paper document into the other document. Performing such procedures is an enormous load on the user.

SUMMARY OF THE INVENTION

Accordingly, it is an object of the present invention to provide a printing system that can set the details of tabbed-paper printing by using a print-settings screen displayed by a printer driver.

The object of the present invention is to provide a printing system that can register at least one tab data item that has been set by using the print-settings screen displayed by the printer driver and can select desired tab data from the registered tab data for printing. According to the present invention, generally used specific titles to be printed on tabbed paper, such as "Section 1" and "Section 2" can be registered by using the print-settings screen displayed by the printer driver. Further, generic titles corresponding to the specific titles can also be registered with the printer driver. Therefore, the user does not have to generate and register new index data by using the print-settings screen, that is, the GUI of the printer driver, each time he/she wants to have the generally used index data printed.

Another object of the present invention is to reuse the generally used index data that has been registered.

Therefore, an aspect of the present invention is directed to an information processing apparatus for generating print data that is used by a printer for printing. The information processing apparatus comprises a setting unit for setting at least one index data item to be printed on a tabbed area of tabbed paper by the printer. The information processing apparatus further comprises a print-data generation unit for reading the set index data item and generating print data corresponding to the set index data item so that the set data item is printed on the tabbed area of tabbed paper by the printer.

Further objects, features and advantages of the present invention will become apparent from the following description of the preferred embodiments with reference to the attached drawings.

DESCRIPTION OF THE PREFERRED EMBODIMENTS

Figure 1:
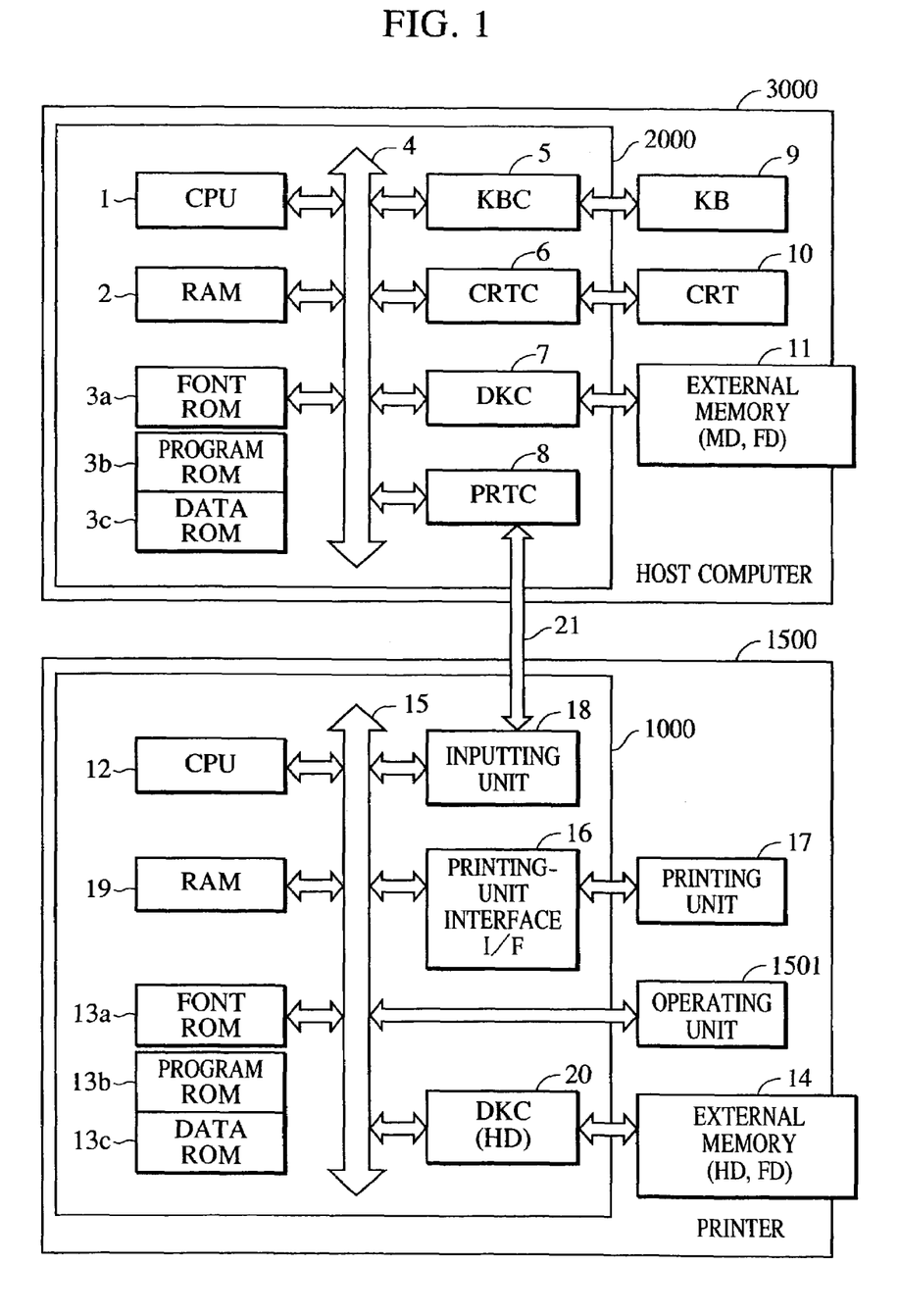
FIG. 1 is a block diagram illustrating the configuration of a printing system according to an embodiment of the present invention.

Preferred embodiments of the present invention will now be described with reference to the attached drawings. FIG. 1 is a block diagram for illustrating the configuration of a printing system according to a first embodiment of the present invention. The system includes a host computer 3000 (a printing control apparatus and an information processing apparatus) and a printer 1500 (a printer) that is connected thereto.

In the following description, a printing system using a laser-beam printer is described as a typical printing system. However, the present invention is not limited to such a case, and can be used for an inkjet printer or a multifunction machine having the function of copying, when the inkjet printer and the multifunctional printer have a tabbed-paper printing function. The printing system may be formed as a discrete machine or a system including a plurality of machines as long as the system has the function of the present invention. Further, the printing system may be connected to the host computer via a network such as a LAN, a WAN, and so forth so as to be processed by the host computer.

In FIG. 1, the host computer 3000 includes a ROM 3 having a font ROM 3a, a program ROM 3b, and a font-data ROM 3c. The host computer 3000 includes a CPU 1 (printing control means and reverse-surface printing control means) for performing processing of a document containing a mixture of drawings, images, text, tables (including a spreadsheet), and so forth based on a document-processing program stored in the program ROM 3a of the ROM 3 or an external memory (HD and FD) 11 such as a hard disk, a floppy disk, and so forth. The CPU 1 has centralized control over each device connected to a system bus 4.

An operating system program (hereinafter referred to as an OS) or the like, which is a control program of the CPU 1, is stored in the program ROM 3b or the external memory 11. Font data used for performing the above-described document processing is stored in the font ROM 3a or the external memory 11. Various kinds of data used for performing the document processing or the like are stored in the font-data ROM 3c or the external memory 11. The data may include, for example, various kinds of page-description language programs, font-rasterizing data, and so forth.

Reference numeral 2 indicates RAM, which can be expanded by adding optional RAM or the like. The RAM 2 functions as a main memory, a work area, and so forth of the CPU 1. Reference numeral 5 indicates a keyboard controller (KBC). The keyboard controller 5 controls a keyboard (KB) 9 and key entry from a pointing device that is not shown.

Reference numeral 6 indicates a CRT controller (CRTC). The CRT controller 6 controls the display shown on a CRT display (CRT) 10. Reference numeral 7 indicates a disk controller (DKC). The disk controller 7 controls access with the external memory 11, which stores a boot program, various kinds of applications, font data, a user file, an edit file, a printer control command generation program (hereinafter referred to as a printer driver), and so forth. Reference numeral 8 indicates a printer controller (PRTC). The printer controller 8 is connected to the printer 1500 via a predetermined bidirectional interface 21. The printer controller 8 controls communication between the host computer 3000 and the printer 1500.

The CPU 1 performs processing for expanding (rasterizing) an outline font to a display-information RAM area defined in the RAM 2 in order to make the printer 1500 print what is on the CRT 10 in a WYSIWYG (What you see is what you get) manner. Further, the CPU 1 opens various kinds of registered windows based on a command issued via a mouse cursor (not shown) or the like on the CRT 10 and performs various kinds of data processing.

For performing printing, a user opens a window relating to printing settings and makes printer settings and print processing method settings for the printer driver. The print-processing method settings include selecting a printing mode.

The printer 1500 is controlled by a printer CPU 12. The printer CPU 12 has a ROM 13 including a font ROM 13a, a program ROM 13b, and a data ROM 13c. The printer CPU 12 performs centralized control over the access with each device connected to a system bus 15 based on a control program or the like stored in the program ROM 13b or a control program or the like stored in an external memory (HD or FD) 14 such as a hard disk, a floppy disk, an IC card, and so forth. Then, the printer CPU 12 outputs an image signal serving as output information to a printing unit (printer engine) 17 connected thereto via a printing-unit interface (I/F) 16.

A control program or the like that can be executed by the printer CPU 12 is stored in the program RAM 13b. Font data (including outline-font data) or the like that is used for generating the above-described output information is stored in the font ROM 13a. When the printer 1500 has no external memory such as a hard disk or the like, information that is used by the host computer 3000 is stored in the data ROM 13c.

An operating unit 1501 is an operating panel provided with switches, an LED display, and so forth (not shown) that are used for performing operations. The printer CPU 12 can communicate with the host computer 3000 via an inputting unit 18. Therefore, the printer CPU 12 can inform the host computer 3000 of the information or the like in the printer 1500.

Reference numeral 19 indicates a RAM mainly serving as a main memory or a work area of the printer CPU 12. The amount of memory of the RAM 19 can be expanded by adding an optional RAM, which is connected to an additional port that is not shown. The RAM 19 is used for an output-information expansion area, an environment-data storing area, a NVRAM, and so forth. The access with the external memory 14 is controlled by a disk controller (DKC) 20. The external memory 14, which stores font data, an emulation program, form data, and so forth, is connected to the printer 1500 as an optional unit.

More than one external memory 14 may be provided. Further, it may be arranged that a plurality of external memories storing an optional font card in addition to the internal font thereof and a program for translating printer control languages of different language systems are connected to the printer 1500. Further, the external memories may have the NVRAM (not shown) and may store printer-mode setting information that is transmitted from an operating unit 1501 for each user or group, for example.

Figure 2:
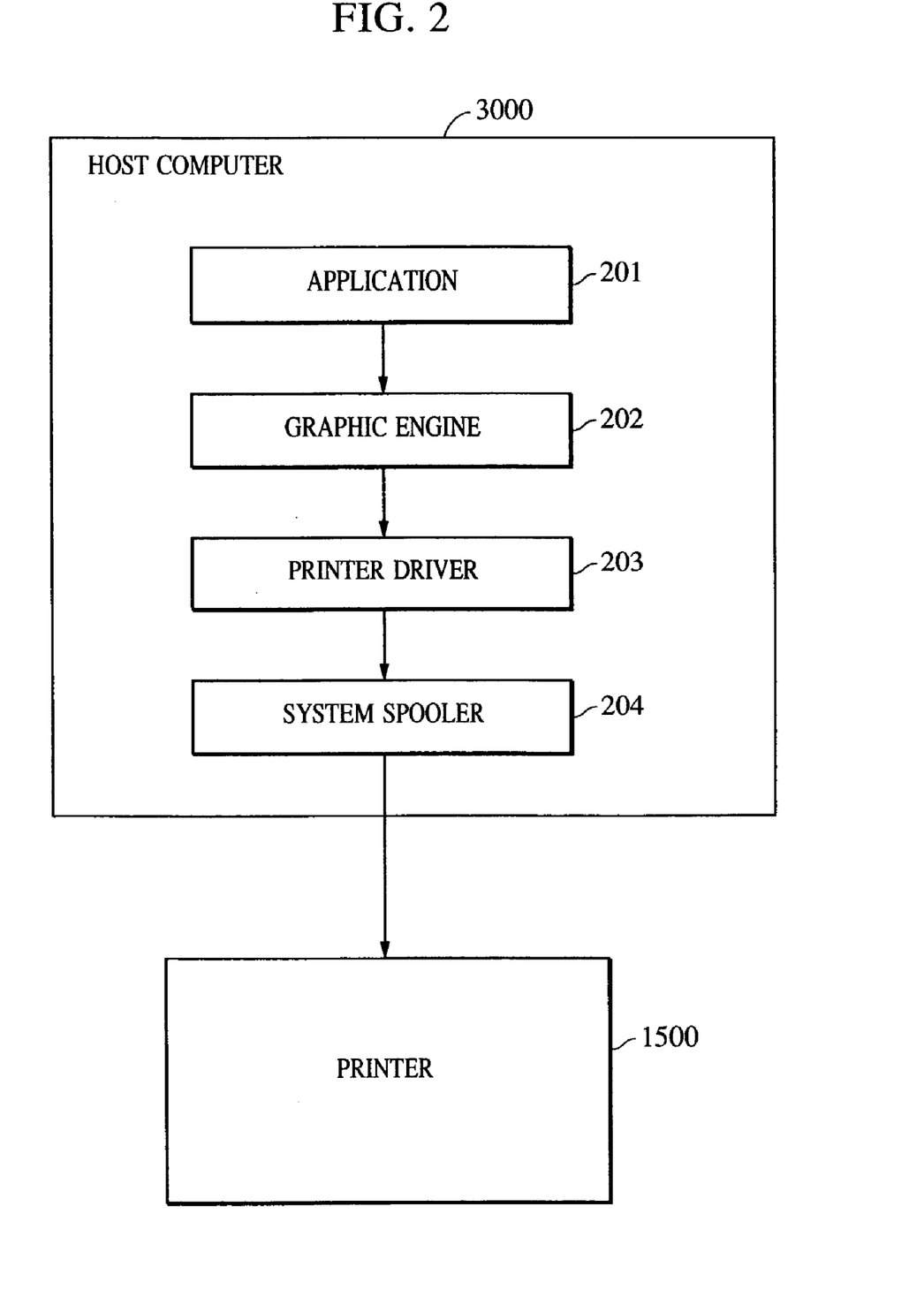
FIG. 2 is a block diagram illustrating the main functions of the printing system.

FIG. 2 is a block diagram illustrating the main functions of the printing system. An application 201, a graphic engine 202, a printer driver 203, and a system spooler 204 in the host computer 3000 are files that are stored in the external memory 11. Further, the application 201, the graphic engine 202, the printer driver 203, and the system spooler 204 are program modules that are loaded into the RAM 2 and executed by an OS or a module that uses the module of the OS.

The application 201 and the printer driver 203 can be added to the HD of the external memory 11 via the FD of the external memory 11, a CD-ROM (not shown), or a network (not shown). The application 201, which is stored in the external memory 11, is loaded into the RAM 2 and is executed. For making the printer 1500 perform printing in a case where the application 201 is used, the graphic engine 202, which is also loaded and executed by the RAM 2, is used for outputting (drawing).

The graphic engine 202 is the drawing means of the OS (operation system). The graphic engine 202 loads each printer driver 203 that is provided for each printer from the external memory 11 into the RAM 2. Then, the graphic engine 202 converts a drawing function (a GDI function in this embodiment) that is an output from the application 201 to a drawing function that can be translated by the printer driver 203 (a DDI function in this embodiment) and transmits the converted drawing function to the printer driver 203. The printer driver 203 converts the DDI function to a printer-control command that can be translated by the printer

1500. The DDI function is the drawing function transmitted from the graphic engine (sometimes referred to as a GDI: a Graphic Device Interface) 202. The printer-control command is transmitted through the system spooler 204, which is loaded into the RAM 2 by the OS, and is output to the printer 1500 via the interface 21.

[Tabbed-Paper Printing Function]

Figure 3A:
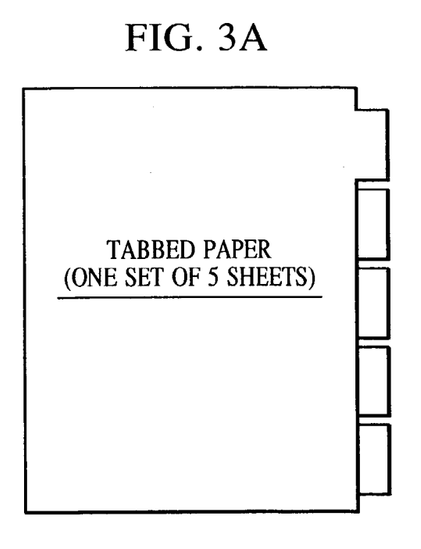
FIG. 3A illustrates 5 sheets of tabbed paper.
Figure 3B:
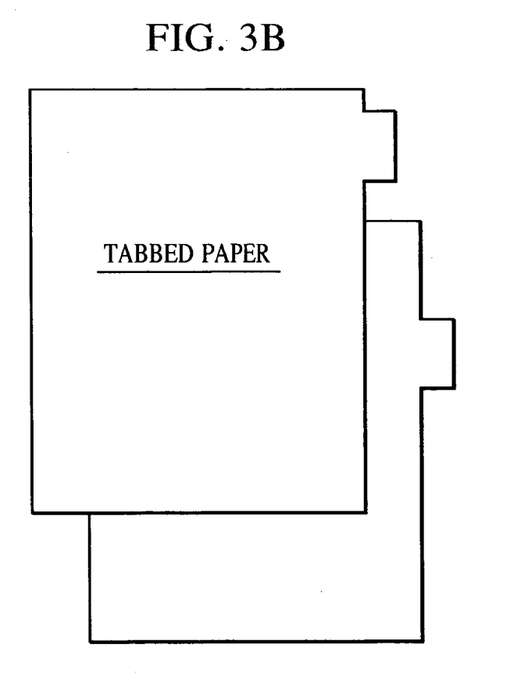
FIG. 3B illustrates the configuration of a first sheet and a second sheet of tabbed paper.
Figure 3C:
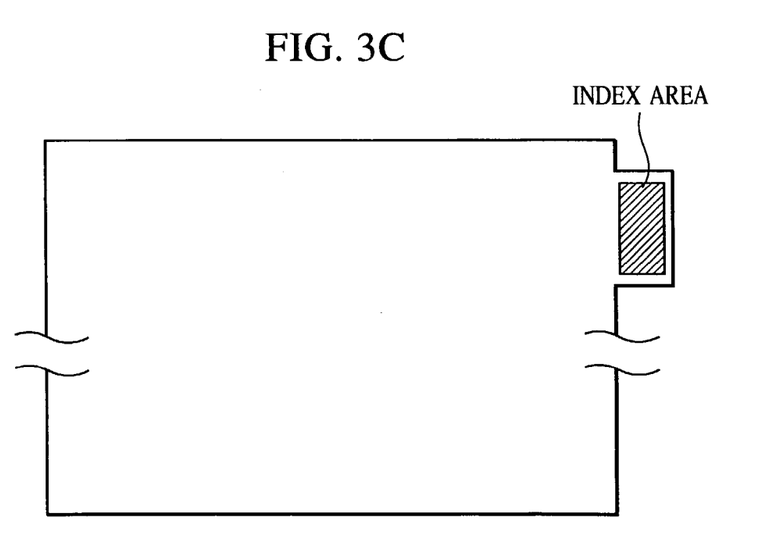
FIG. 3C further illustrates the configuration of the first sheet of tabbed paper.

FIGS. 3A, 3B, and 3C illustrate typical tabbed papers. FIG. 3A illustrates a set of 5 sheets of tabbed paper, for example, even though the number of sheets of commercially available tabbed paper is not always 5. Of course, the present invention is not limited to the above-described case. The tabbed paper in FIG. 3A is aligned to be inserted into a document that is to be opened towards the left, for example, even though commercially available sets of paper are not always used for documents that are opened towards the left and other variations are possible with the present invention.

FIG. 3B illustrates the configuration of a first sheet and a second sheet of tabbed paper. As shown in the drawing, each sheet has a projection (an index area) for writing index information thereon, which is attached to one side thereof. The index areas are arranged so that they do not overlap one another. FIG. 3C illustrates a case where index information "No. 01" is printed on the index area of the first sheet. In this drawing, the index information "No. 01" is printed in the horizontal direction. However, the index information may be printed in the vertical direction.

Figure 4A:
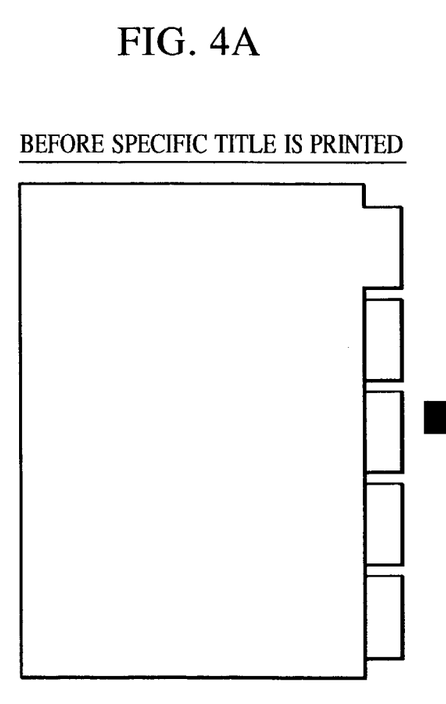
FIG. 4A illustrates the tabbed-paper printing functions of the printing system.
Figure 4B:
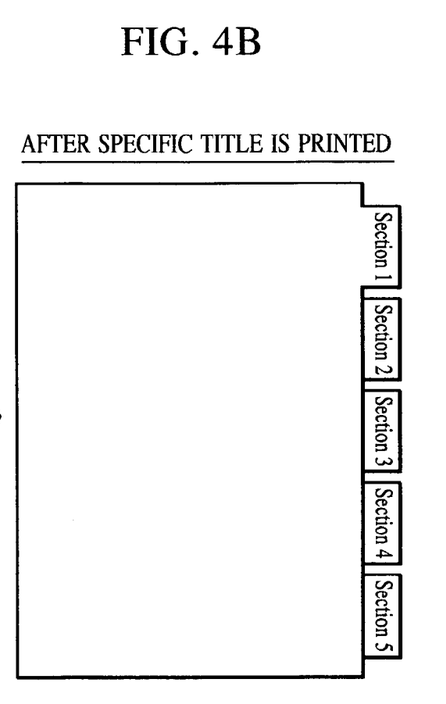
FIG. 4B further illustrates the tabbed-paper printing functions of the printing system.

FIG. 4A illustrates a case where the tabbed-paper printing function is not yet performed by the printer 1500. On the other hand, FIG. 4B illustrates a case where the tabbed-paper printing function has been performed by the printer 1500. Therefore, FIG. 4A illustrates a case where sheets of tabbed paper are overlaid on one another wherein no information is printed on the index areas of the tabbed papers. FIG. 4B illustrates a case where other sheets of tabbed paper are overlaid on one another after the tabbed-paper printing function is added to the printer 1500. The tabbed paper, excluding the index areas are a standard size. For example, the tabbed paper, excluding the index areas may be letter-sized, A4-sized, and so forth. Therefore, by inserting tabbed paper between pages of a document after the tabbed-paper printing function is added to the printer 1500, it becomes possible to immediately see the categories of the document contents.

Figure 5:
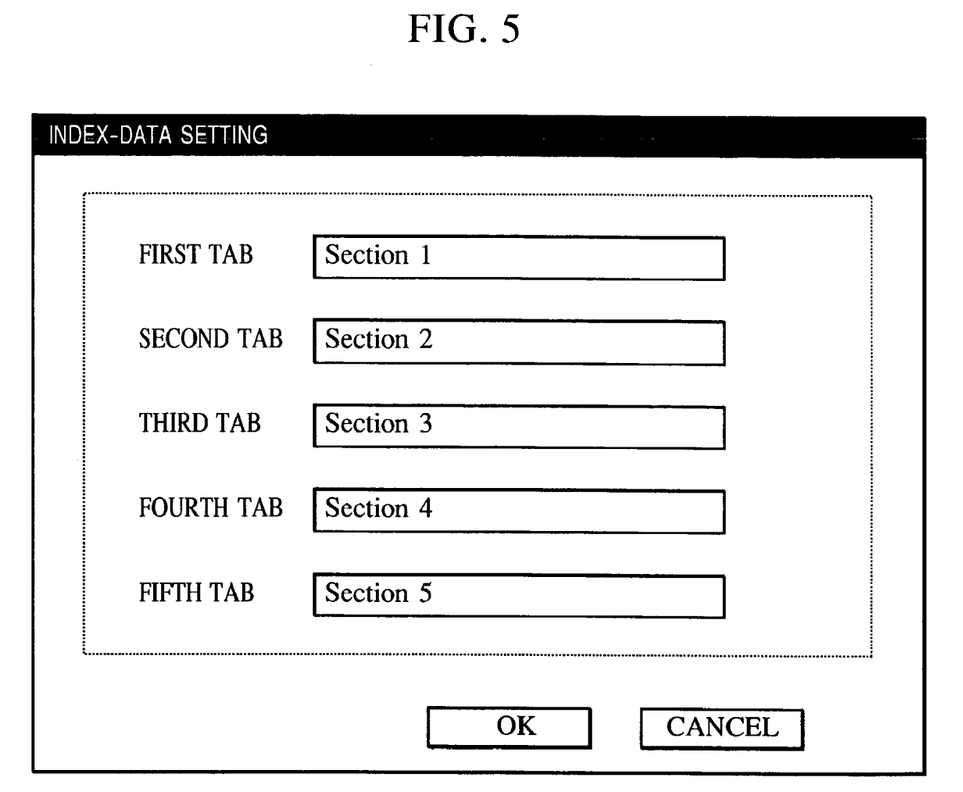
FIG. 5 illustrates the procedures performed for tabbed-paper printing when index data is set each time the tabbed-paper printing is performed.

When the tabbed-paper printing function is added to the printer 1500, the user of the printer generates index information every time he/she makes a document. FIG. 5 illustrates the details of the tabbed-paper printing function. A graphical user interface (hereinafter referred to as a GUI) in an index-information setting screen shown in FIG. 5 is called up from a print-setting property screen displayed by the printer driver 203. This drawing illustrates a typical text-edit box for inputting text information that is printed on each index area of the 5 sheets of tabbed paper. The user inputs index information "Section 1", which is printed on a first tabbed sheet, into the uppermost edit box, index information "Section 2", which is printed on a second tabbed sheet, into the second edit box, index information "Section 3", which is printed on a third tabbed sheet, into the third edit box, index information "Section 4", which is printed on a fourth tabbed sheet, into the fourth edit box, and index information "Section 5", which is printed on a fifth tabbed sheet, into the lowermost edit box.

After inputting the above-described index information in the edit boxes, the user presses an "OK" button shown in the drawing. When the user wants to cancel generation of the index information, the user presses a "cancel" button shown in the drawing. When the "OK" button is pressed, an index-information registering module of the printer driver 203 writes the contents of the index information into a predetermined storage area (for example, DEVMODE) for use at printing time. Thus, according to a first embodiment of the present invention, index information for a plurality of tabs can be stored via a user interface displayed by a printer driver so that the index information can be printed on tabs of tabbed paper. Further, since the index information for the plurality of tabs is registered, the printer driver can generate print data including control commands from the registered index information at printing time. Therefore, tabbed-paper printing can be easily performed as desired by the user.

As has been described in the embodiment above, the index information, which is used when tabbed-paper printing is performed, is set by using the index-information setting screen displayed by the printer driver 203. Further, the index information, that is, the above-mentioned "Section 1", "Section 2", "Section 3" "Section 4", and "Section 5", is maintained in the predetermined storage area. Therefore, the index information that was stored for the previous tabbed-paper printing can be used again when the next tabbed-paper printing is performed.

However, according to the contents of a document into which the tabbed paper is inserted, the user may determine that other index information including "Part 1", "Part 2", "Part 3", "Part 4" and "Part 5" should be printed on the tabbed paper. That is to say, index information that was set for the previous tabbed-paper printing is not always used for the next tabbed-paper printing.

As has been described, the index information is stored by using the index-information setting screen, which is displayed by the printer driver 203. However, when a tabbed-paper printing function is added wherein the user is required to input the index information, the user must generate the index information every time he/she uses the tabbed-paper printing function.

According to a second embodiment of the present invention, typical index information and frequently used index information can be used repeatedly. Therefore, according to the second embodiment, the user does not need to generate the index information every time he/she uses the tabbed-paper printing function. An index-information reusing processing method according to the second embodiment will now be described.

[Print Control Procedures]

Figure 6:
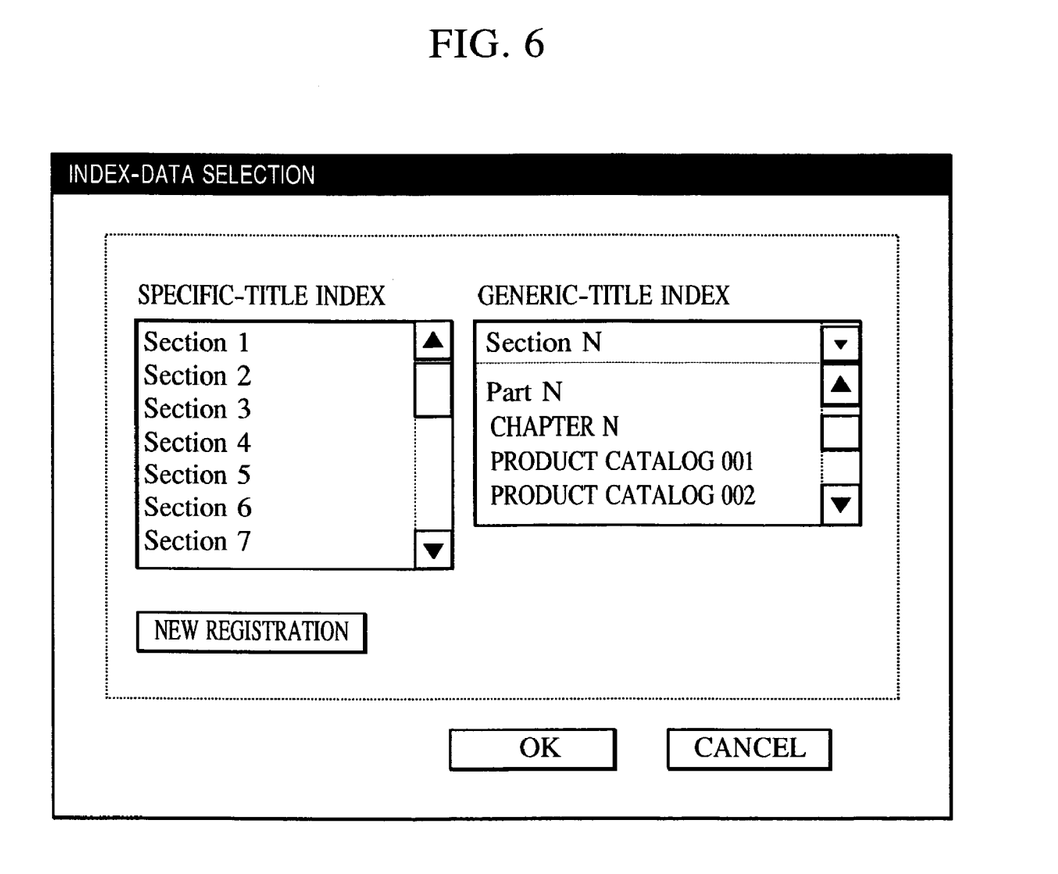
FIG. 6 illustrates a user interface used for reusing the index data according to an embodiment of the present invention.
Figure 7:
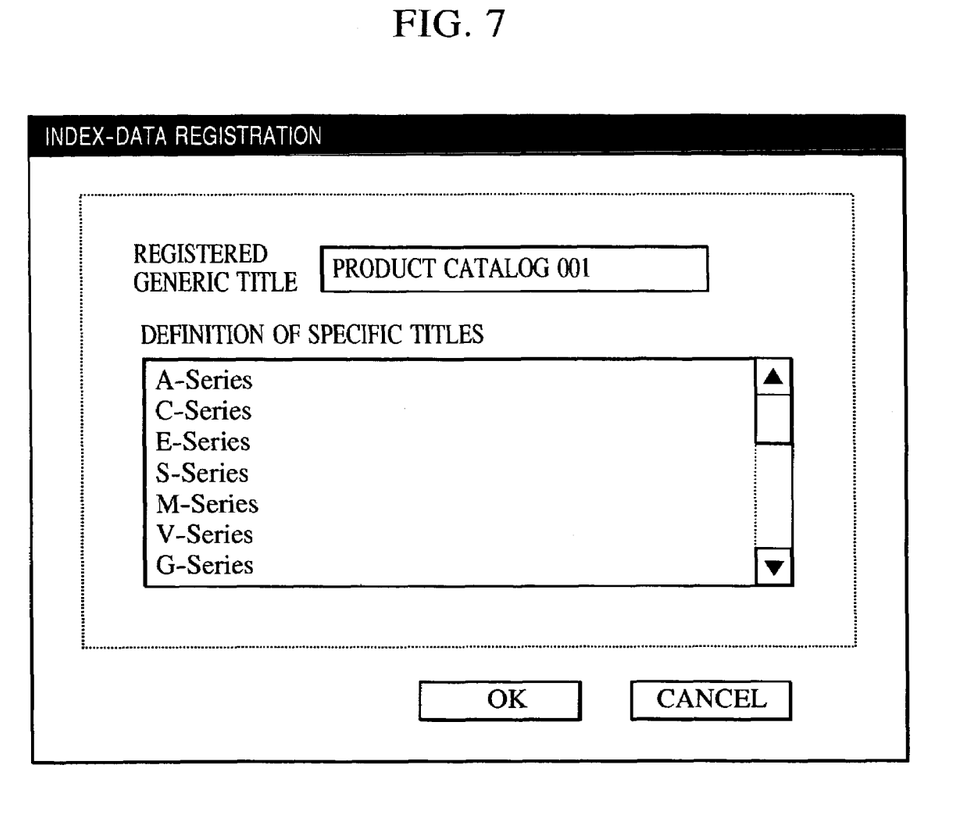
FIG. 7 illustrates a user interface used for registering the index data according to an embodiment of the present invention.

FIGS. 6 and 7 illustrate typical user interfaces (GUIs) according to the index-data reusing processing method of the second embodiment. FIG. 6 shows one user interface serving as the index-data setting screen. FIG. 7 shows another user interface serving as an index-data registration screen. The two user interfaces are called up from the print-setting properties screen, which is displayed by the printer driver 203. The user interface shown in FIG. 6 is a screen for selecting index data, to be used for performing tabbed-paper printing, from the previously stored index data. The user interface shown in FIG. 7 is a screen for registering index data that is likely to be used frequently.

By using the user interface shown in FIG. 6, the user selects index data that should be printed on the index area of the tabbed paper from one or more index data items that have been stored (referred to as "specific-title index" in FIG. 6). The details of the selection will be described later with reference to FIG. 7. The text box "specific-title index" in FIG. 6 illustrates the registered specific titles. A text box "generic-title index" in FIG. 6 shows registered generic titles, which have been registered by using the user interface shown in FIG. 7.

In the text box "specific-title index" in FIG. 6, the details of "Section N" selected by the user are shown as "Section 1", "Section 2", and so forth. Since, in this way, the user can understand the details of the "generic title", he/she can select the most appropriate generic title for a document into which the tabbed paper is to be inserted. When the user presses a "new registration" button positioned at the lower end of the interface shown in FIG. 6, the user interface shown in FIG. 7 is displayed. The details of an "OK" button and a "cancel" button that are placed at the lower end of the user interface shown in FIG. 6 will be described later. However, it should be noted that the "OK" button is a control button that is used for selecting the generic title and the "cancel" button is another control button that is used for canceling the selected generic title.

By using the user interface shown in FIG. 7, the user generates generic titles for registration (referred to as "registered generic title") and the details of the generic title for registration (referred to as a text box "definition of specific titles" shown in FIG. 7).

As shown in FIG. 7, a new generic title "product catalog 001" is registered in the text box "registered generic title". The specific titles of the "product catalog 001", such as "A-series", "C-series", and so forth, are registered in the text box "definition of specific titles". Both the text box "registered generic title" and the text box "definition of specific titles" enter a selection mode when the cursor, which is moved by the mouse, is positioned thereon and clicked. Then, the user can input text via the keyboard.

An "OK" button that is provided at the lower end of the user interface, as shown in FIG. 7, is a control button for registering the new generic title and the specific titles. A "cancel" button that is also provided at the lower end of the user interface, as shown in FIG. 7, is another control button for canceling the registration of the new generic title and the specific titles. If the user presses the "OK" button or the "cancel" button, the user interface shown in FIG. 6 is displayed. When the user presses the "OK" button and the new generic title and the specific titles are registered, the new generic title and specific titles, which are registered via the GUI shown in FIG. 7, are stored as an index-data settings file in a predetermined area (more specifically, the system folder in the case where the OS is Microsoft Windows(R)).

Thus, according to the embodiment, the user can register a new generic title. However, by providing a "delete" button, for example, on the user interface shown in FIG. 6, the user can arbitrarily select one or more generic titles from the "generic-title index" and can delete one or more specific titles corresponding to the one or more selected generic titles. The user can edit the specific titles that have been registered. Here, text that is printed on a tab of the tabbed paper is referred to as a "specific title", and a group of the specific titles, which are printed on the tabs, is referred to as a "specific-title group". A generic title and one or more specific titles that are registered corresponding to the generic title are collectively referred to as "tab data".

Figure 8:
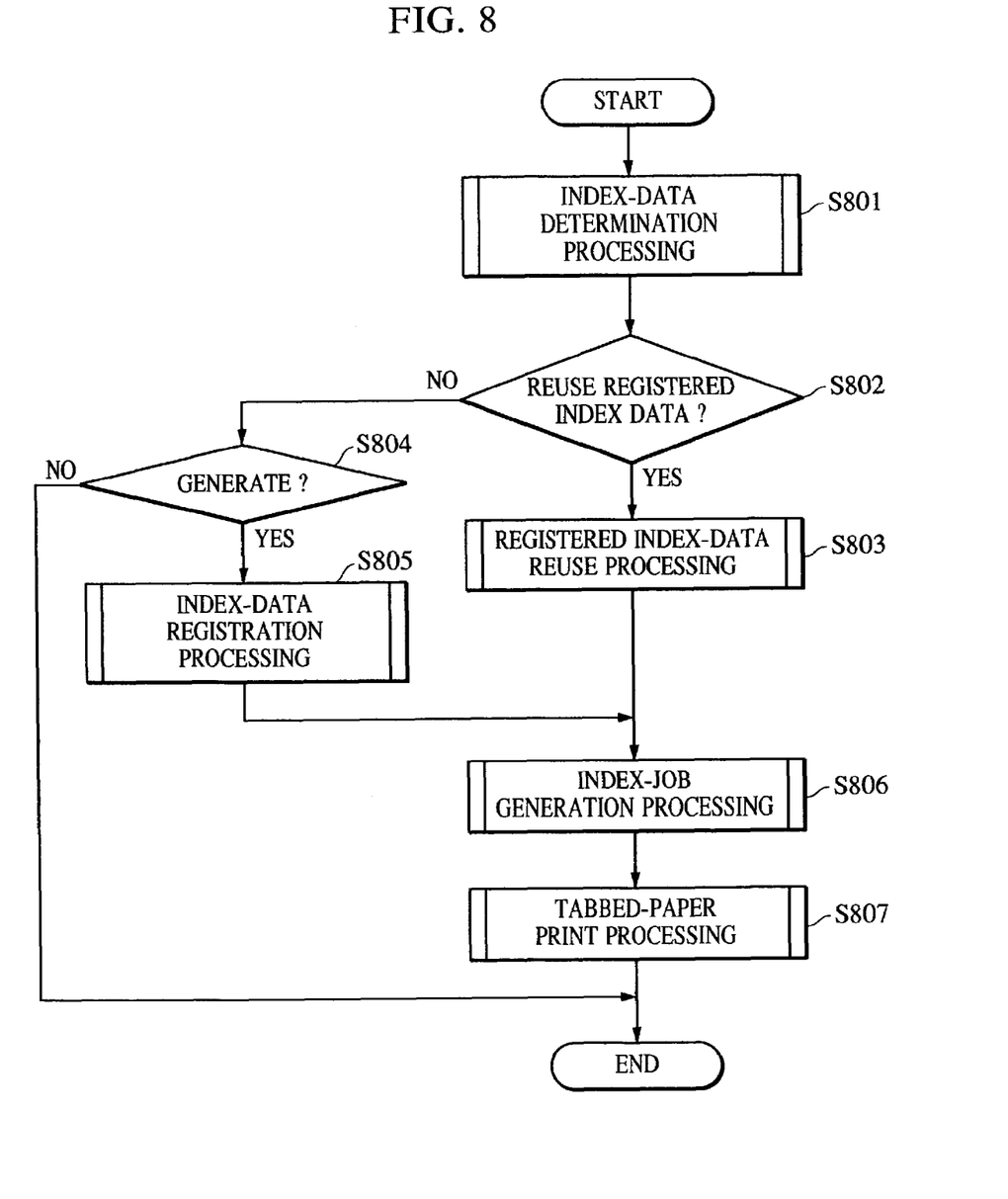
FIG. 8 illustrates the flow of the procedures performed for reusing the index data according to an embodiment of the present invention.

FIG. 8 is a flowchart illustrating the procedure performed for reusing the index data according to the embodiment. The first half of the flowchart illustrates the procedure that is performed, using a user interface screen that is not shown, for determining the orientation of writing (the horizontal direction, the vertical direction, 180° rotation of vertically oriented text, and so forth), the font name, the font size, etc. Such procedures are started by opening the print-setting property screen (not shown) displayed by the printer driver 203 and by pressing a "set tabbed-paper printing details" button (not shown) for opening the GUI shown in FIG. 6.

First, the user selects the tab data used for printing from the previously registered index data by using the user interface shown in FIG. 6 or registers new index data by using the user interface shown in FIG. 7 (Step S801). The descriptions of types of data or information that are selected or registered are omitted since they have been described above. When the user presses the "OK" button in the user interface shown in FIG. 6 after he/she selects a generic name from the "generic-title index", or when the user presses the "OK" button or the "cancel button" in the user interface shown in FIG. 6 after he/she registers new index data by using the user interface shown in FIG. 7 and selects the registered index data by using the user interface shown in FIG. 6, the step advances to step S802.

At step S802, the printer driver 203 determines whether or not reusing of the registered index data is selected at step S801. When the printer driver 203 determines that the reusing was selected, it advances to step S803. Otherwise, the printer driver 203 advances to step S804. The printer driver 203 determines that the reusing of the registered index data is selected when the user selects a desired generic title from the "generic-title index" and presses the "OK" button in the user interface shown in FIG. 6.

At step S803, the printer driver 203 reads a generic title and a specific-title group corresponding to the generic title from the index-data setting file (hereinafter referred to as a registered index-data table), which is included in the printer driver 203, or which is an external file to be referred to. Then, the printer driver 203 advances to step S806.

In the case where the number of tabbed papers used for printing is smaller than the number of tabs, the printer driver 203 informs the user of the fact by using a message dialog (not shown). Then, the user determines whether to let the printer driver 203 perform printing or to go back to change the number of tabbed papers by using the message dialog. When the user determines to let the printer driver 203 perform printing, the printer driver 203 can print the registered index data from the first part thereof on the tabbed papers.

In the case where the number of tabbed papers used for printing is larger than the number of tabs, the printer driver 203 informs the user of the fact by using a message dialog (not shown). Then, the user determines whether to let the printer driver 203 perform printing or to go back to change the number of tabbed papers by using the message dialog.

Figure 9:
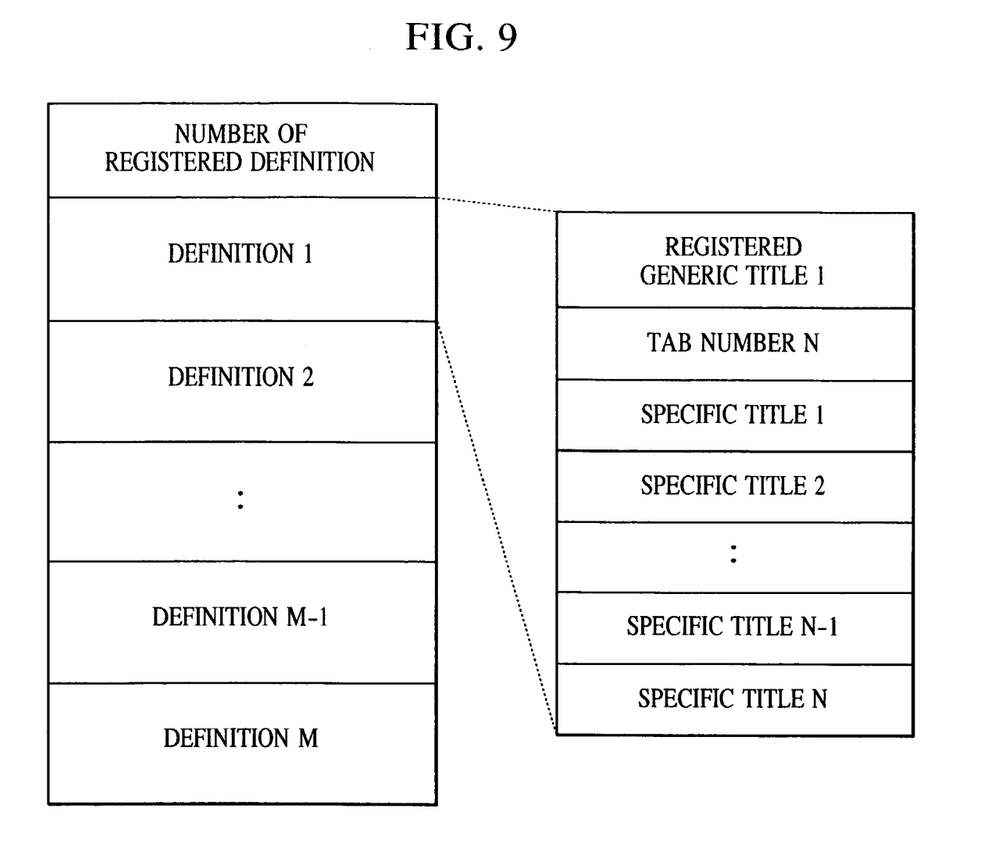
FIG. 9 illustrates the configuration of a registered index-data table according to an embodiment of the present invention.

FIG. 9 illustrates the details of the registered index-data table. As shown in this drawing, the registered index-data table stores the generic titles, the number of tabs, and text data or the specific titles to be printed on the tabs. Since FIG. 9 illustrates the conceptual configuration of the registered index-data table, the format of the registered index-data table is not limited to that shown in FIG. 9 as long as the table is appropriate for controlling the index data. For example, the table may store the specific titles, numerical values, and so forth, using binary-format representations or XML-format representations. The XML-format representations are structured text-format representations.

When the printer driver 203 determines that the reusing of the index data was not selected at step S802, the step advances to step S804. The printer driver 203 determines whether or not to generate the new index data at step S804. If the printer driver 203 determines to generate the new index data, the step advances to step S805. Otherwise, that is to say, when the user presses the "cancel" button in the user interface shown in FIG. 6, the printer driver 203 stops operating for reusing the index-data.

If the printer driver 203 determines to generate the new index data at step S804, the step advances to step S805. At step S805, an index-data registration module (not shown) of the printer driver 203 stores the index data, that is, the tab data, that is newly registered by using the user interface shown in FIG. 7 in the registered index-data table. The tab data includes the text, that is, the specific titles that are to be printed on the tabs of the sheets of tabbed paper, the tab number, and the generic title of the specific titles. Then, the step advances to step S806. The tab number is input in the text box "definition of specific titles" shown in FIG. 7 by the user.

In the case where the number of tabbed-paper sheets used for printing is smaller than the number of tabs, the printer driver 203 informs the user of the fact by using a message dialog (not shown). Then, the user determines whether to let the printer driver 203 perform printing or to go back to change the number of tabbed-paper sheets by using the message dialog. When the user determines to let the printer driver 203 perform printing, the printer driver 203 can print the registered index data from the first part thereof on the tabbed-paper sheets.

In the case where the number of tabbed-paper sheets used for printing is larger than the number of tabs, the printer driver 203 informs the user of the fact by using a message dialog (not shown). Then, the user determines whether to let the printer driver 203 perform printing or to go back to change the number of tabbed-paper sheets by using the message dialog.

At step S806, the printer drier 203 generates print-job data based on the index data that has been determined at step S803, or at step S805, for printing the determined index data onto the tabbed paper. Then, the step advances to step S807. At step S807, the printer driver 203 outputs the print-job data, which is generated at step S806, to the system spooler 204 of the OS, thereby terminating the process of reusing the index data. The system spooler 204 transmits the print-job data to the printer 1500. Upon receiving the print-job data, the printer 1500 prints the index data on the sheets of tabbed paper.

Figure 10:
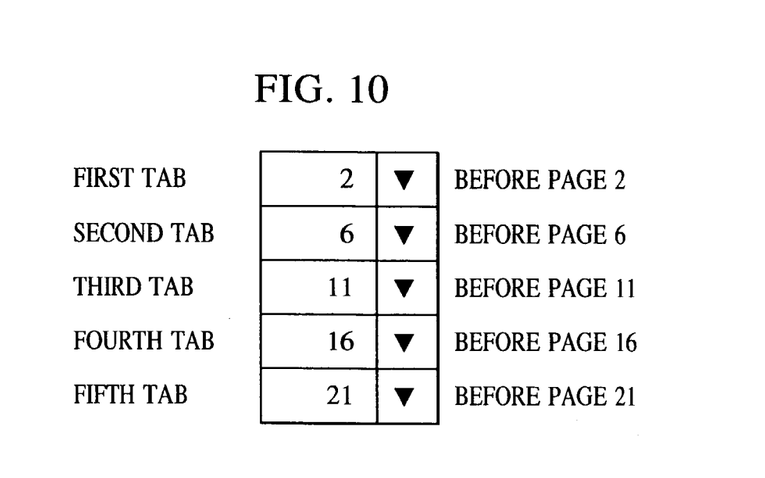
FIG. 10 illustrates a typical graphical user-interface screen for determining positions at which pages with the index data printed thereon are to be inserted.

The details of a process of generating an index job (S806) shown in FIG. 8 will be described. FIG. 10 illustrates a typical graphical user interface for determining positions in the document where the sheets of tabbed paper are to be inserted. Each item of the index data (represented by the first to fifth tabs shown in FIG. 10) is printed on the corresponding sheet of tabbed paper. When tabbed-paper printing is selected by the user via the print-setting properties screen, which is displayed by the printer driver 203, for printing a document that is made by using the application 201, the user can determine the positions in the document where the sheets of tabbed paper are to be inserted.

By using the graphical user interface shown in FIG. 10, the user can determine the positions in the document, which is made by using the application 201, where the sheets of tabbed paper are to be inserted.

Accordingly, the user can make the printer 1500 perform printing after he/she determines the positions in the document where the sheets of tabbed paper are to be inserted. Then, at step S806 where an index job is generated, the printer driver 203 receives a plotting function (a DDI function). The DDI function is obtained by converting a plotting function (a GDI function) via the graphic engine 202. The GDI function is generated by the application 201.

Then, the printer driver 203 converts the DDI function into a page-description language (a PDL) per page.

The printer driver 203 compares the pages of the document, which is transmitted from the application 201, and the pages shown in the user interface shown in FIG. 10. If the printer driver 203 determines that one of the pages corresponds to one of the set pages shown in FIG. 10, the printer driver 203 reads index data corresponding to the set page from the tab data in the registered index-data table. The printer driver 203 further reads items of index data corresponding to each tab number and generates a PDL. Here, the printer driver 203 generates and enters a tabbed-paper print command because the page on which the index data is printed is a tabbed-paper sheet. Because, even though the printer 1500 performs regular printing upon receiving the PDL, for the page for which the tabbed-paper print command is entered, the printer 1500 unarchives the PDL, generates and prints a bit-map image on the tabbed-sheet at a shifted position. The image is formed by, for example, charging in the case where an electrophotographic printer is used, or spraying ink in the case where an ink jet printer is used.

Thus, for the page that has been set by the user interface shown in FIG. 10, the printer driver 203 generates the print-job data by entering the tabbed-paper print command and generating the PDL.

According to this embodiment, for generating the specific titles which are to be printed on the tabbed area of tabbed paper, the user can select desired specific titles from the registered specific-title group including generally used specific titles, such as "Section 1", "Section 2", and so forth. Otherwise, the user can register new index data and select desired index data therefrom. Subsequently, the user can reuse generally used or frequently used index data without generating new data each time the tabbed-paper printing is performed. That is to say, the reduction of the tabbed-paper printing procedures benefits offices where large-volume documents are printed and the near-print publication industry.

OTHER EMBODIMENTS

The present invention can be used for a system including a plurality of apparatuses, such as a host computer, an interface, a reader, and a printer. Further, the present invention can be used for an apparatus, such as a copier, a printer, or a facsimile machine.

In the above-described embodiment, the specific titles are printed on the tabbed area of the tabbed paper. However, other index data, such as a bar code, or an image may be printed.

Further, a recording medium storing the program code of software that achieves the above-described functions may be supplied to a print-control apparatus or a print-control system. Then, a computer (or a CPU or a MPU) included in the print-control apparatus may read the program code and may execute it for achieving the object of the present invention.

Thus, the program code that is read from the recording medium achieves the new functions of the present invention. Therefore, in such a case, the recording medium storing the program code serves as the component of the present invention.

The recording medium for storing the program code may be a floppy disk, a hard disk, an optical disk, a magneto-optical disk, a CD-ROM, a CD-R, a magnetic tape, a nonvolatile memory, or a ROM.

As discussed, the above-described functions can be achieved by executing the program code read by the computer. However, an OS operated on the computer based on the instructions of the program code may perform part of the procedures or all the procedures for achieving the functions of the present invention.

Further, when the program code read from the recording medium is stored in an expansion board provided in the computer or in a memory provided in an expansion unit connected to the computer, a CPU in the expansion board or the expansion unit may perform part of the procedures or all the procedures for achieving the functions of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

As has been described, according to the present invention, a desired information group can be selected from information groups that have been registered in storing means and the output data of the selected information group can be printed on paper at a predetermined position. Therefore, the output data of the registered information groups can be reused. Since the user does not have to reenter the output data of the registered information for printing, reduction of the printing procedures is achieved.

What is claimed is:

1. An information processing apparatus having a printer driver for generating print data that is used by a printer for printing, the information processing apparatus comprising:

setting means for setting at least one index data to be printed on a tabbed area of tabbed paper by the printer;

registering means for registering the index data set by said setting means as a group;

storage means for storing a plurality of groups registered by said registering means;

display control means for displaying a user interface to select a group, which includes the index data to be printed on the tabbed area of the tabbed paper, from the plurality of groups stored by said storage means;

selection means for selecting the group, which includes the index data to be printed on the tabbed area of the tabbed paper, via the user interface displayed by said display control means; and print-data generation means for generating print data based on the index data, which is included in the group selected by said selection means, so that the index data is printed on the tabbed area of the tabbed paper by the printer, wherein said display control means displays (a) identification information of each of the plurality of groups and (b) the index data, which is included in the group selected by said selection means, in the same user interface.

2. An information processing method for generating print data that is used by a printer for performing printing, the information processing method comprising the steps of:

setting at least one index data to be printed on a tabbed area of tabbed paper by the printer;

registering the index data set by said setting step as a group;

storing a plurality of groups registered by said registering step;

displaying a user interface to select a group, which includes the index data to be printed on the tabbed area of the tabbed paper, from the plurality of groups stored by said storage step;

selecting the group, which includes the index data to be printed on the tabbed area of the tabbed paper, via the user interface displayed by said displaying step; and generating print data based on the index data, which is included in the group selected by said selecting step, so that the index data is printed on the tabbed area of tabbed paper by the printer, wherein said displaying step displays (a) identification information of each of the plurality of groups and (b) the index data, which is included in the group selected by said selecting step, in the same user interface.

3. A print-control program embodied on computer-readable storage medium, to be executed by an information processing apparatus having a printer driver that generates print data used by a printer for printing, the print-control program comprising the steps of:

setting at least one index data to be printed on a tabbed area of tabbed paper by the printer;

registering the index data set by said setting step as a group;

storing a plurality of groups registered by said registering step;

displaying a user interface to select a group, which includes the index data to be printed on the tabbed area of the tabbed paper, from the plurality of groups stored by said storage step;

selecting the group, which includes the index data to be printed on the tabbed area of the tabbed paper, via the user interface displayed by said displaying step; and generating print data based on the index data, which is included in the group selected by said selecting step, so that the index data is printed on the tabbed area of tabbed paper by the printer, wherein said displaying step displays (a) identification information of each of the plurality of groups and (b) the index data, which is included in the group selected by said selecting step, in the same user interface.

4. An information processing apparatus according to claim 1, further comprising:

designation means for designating a page of which index data is to be printed, wherein said print-data generation means generates print data to which a tabbed-paper printing command is inserted, on the page designated by said designation means.

5. An information processing apparatus according to claim 1, further comprising:

comparing means for comparing the number of sheets of the tabbed paper with the number of index data which is included in the group selected by said selection means, wherein said display control means indicates the comparison result when the number of sheets and the number of index data are determined to be discrepant based on the comparison result of said comparing means.

6. A method according to claim 2, further comprising:

designating a page of which index data is to be printed, wherein said print-data generation step generates print data to which a tabbed-paper printing command is inserted, on the page designated by said designating step.

7. A method according to claim 2, further comprising:

comparing the number of sheets of the tabbed paper with the number of index data which is included in the group selected by said selecting step, wherein said displaying step indicates the comparison result when the number of sheets and the number of index data are determined to be discrepant based on the comparison result of said comparing step.

* * * * *

UNITED STATES PATENT AND TRADEMARK OFFICE
CERTIFICATE OF CORRECTION

PATENT NO. : 7,298,521 B2 Page 1 of 1
APPLICATION NO. : 10/326069
DATED : November 20, 2007
INVENTOR(S) : Eiji Hayashi It is certified that error appears in the above-identified patent and that said Letters Patent is hereby corrected as shown below:

<u>COLUMN 9</u>:

Line 32, "printer drier 203" should read --printer driver 203--.

<u>COLUMN 12</u>:

Line 24, "on computer-read-" should read --on a computer-read- --.

Signed and Sealed this

Thirty-first Day of March, 2009

JOHN DOLL
*Acting Director of the United States Patent and Trademark Office*